United States Patent Office 3,272,847
Patented Sept. 13, 1966

3,272,847
PROCESS FOR PREPARING EQUILIN AND THE INTERMEDIATES PRODUCED THEREIN
Douglas S. Irvine, Rosemere, Quebec, Jehan F. Bagli, Montreal, Quebec, Peter F. Morand, Ottawa, Ontario, Claude Vezina, Oka, Quebec, and Karel Wiesner, Westmount, Quebec, Canada, assignors to American Home Products Corporation, New York, N.Y., a corporation of Delaware
No Drawing. Filed Jan. 15, 1964, Ser. No. 337,753
17 Claims. (Cl. 260—397.3)

The present invention relates to a process for preparing steroids with an aromatic structure in ring A.

More particularly, the present invention relates to the partial synthesis of equilin, an important estrogenic hormone, and to certain novel intermediates used in the synthesis of equilin.

Moreover, this invention relates to a process for preparing equilin which process appears to be superior to the presently available process as described in the chemical literature.

There is, for example, a process for the preparation of equilin described by J. A. Zderic et al. in Steroids 1, 233 (1960); J. Am. Chem. Soc., 80, 2596 (1958); and in U.S. Patent No. 3,067,212. As distinguished therefrom, the process of this invention uses 3β-hydroxyandrost-5-en-17-one-19-oic acid (I) as one of the starting materials. This is a compound which is easily obtained by treatment of 3β-acetoxy-5α-bromo-6β-hydroxy-androstan-17-one-19-oic acid 6,19-lactone. The latter compound was described by Akhtar and Barton in J. Am. Chem. Soc., 84, 1496 (1962). Our starting material, 3β-hydroxyandrost-5-en-17-one-19-oic acid (I) is readily obtained from the known compound by treatment thereof with zinc in methanol solution followed by alkaline hydrolysis.

In accordance with our process, 3β-hydroxyandrost-5-en-17-one-19-oic acid (I) is subjected to an Oppenauer-type oxidation in the presence of chloranil to yield estra-4,6-diene-3,17-dione (IIa), and the latter compound, upon treatment with an alkali metal alkoxide, such as, e.g., potassium methoxide or preferably potassium t-butoxide, in dimethylsulfoxide or dimethylformamide solution, or by using a previously prepared solution of methylsulfinyl anion in dimethyl-sulfoxide prepared according to Corey and Chaykovsky, J. Am. Chem. Soc., 84, 866 (1962), yields estra-4,7-diene-3,17-dione (IIIa).

In the same manner 17β-acetoxyestra-4,6-dien-3-one (IIb), prepared as described in U.S. Patent No. 3,067,-212, yields 17β-hydroxyestra-4,7-dien-3-one (IIIb); and 17β-acetoxyandrosta-4,6-dien-3-one (IIc), prepared as described by Wettstein in Helv. Chim. Acta 23, 388 (1940), yields 17β-hydroxyandrosta-4,7-dien-3-one (IIIc).

The reactions described above constitute an unexpectedly successful direct deconjugation of a steroidal Δ4,6-3-ketone to the corresponding Δ4,7-3-ketone. Although those skilled in the art are familiar with the deconjugation of a steroidal Δ4-3-ketone to the corresponding Δ5-3-ketone, the presence of further centers of unsaturation seemed to make such deconjugations impossible. For example, Ringold and Malhotra have recently reported [Tetrahedron Letters, 15,669 (1962)], that they were unable to deconjugate steroidal Δ4,6-3-ketones or Δ1,4-3-ketones.

This unexpected success in deconjugating a steroidal Δ4,6-3-ketone to the corresponding Δ4,7-3-ketone may be attributed to the nature of the solvents employed. By using non-aromatic solvents which are at the same time not proton-donating, such as, e.g., dimethylsulfoxide, dimethylformamide, or a solution of the methylsulfinyl anion in dimethylsulfoxide, the desired deconjugation may be effected.

The above deconjugation may be carried out at temperatures from 0°–100° C. with the preferred range being from room temperature (20°–24° C.) to about 60° C. The time of reaction may be varied within the limits of from 2 minutes to 2 hours, with the preferred range being from about 5 minutes to about 50 minutes. At the end of the reaction period the reaction is quenched by adding dilute aqueous acid, such as, e.g., boric acid or acetic acid, and the desired deconjugated Δ4,7-3-ketone may be isolated by solvent extraction and purified by chromatography.

When exposing either estra-4,7-diene-3,17-dione (IIIa), or 17β-hydroxyestra-4,7-dien-3-one (IIIb) to the activity obtainable in a substantially neutral medium inoculated, for example, with the microorganism Nocardia restrictus, equilin (IV) is obtained. This may be achieved by exposing those compounds to the enzymatic activity obtainable from a growing culture of Nocardia restrictus, or to the enzymatic activity obtainable from the spores of the same organism in accordance with the procedure described in U.S. Patent 3,031,379. A similar microbiological transformation has been described in U.S. Patent 3,067,212.

Alternatively, 17β - hydroxyandrosta-4,7 - dien - 3-one (IIIc) may be converted by chemical or microbiological means to androsta-1,4,7-triene-3,17-dione, and the latter compound may be converted to equilin (IV) as described in U.S. Patent 3,067,212.

The following formulae and examples will illustrate this invention.

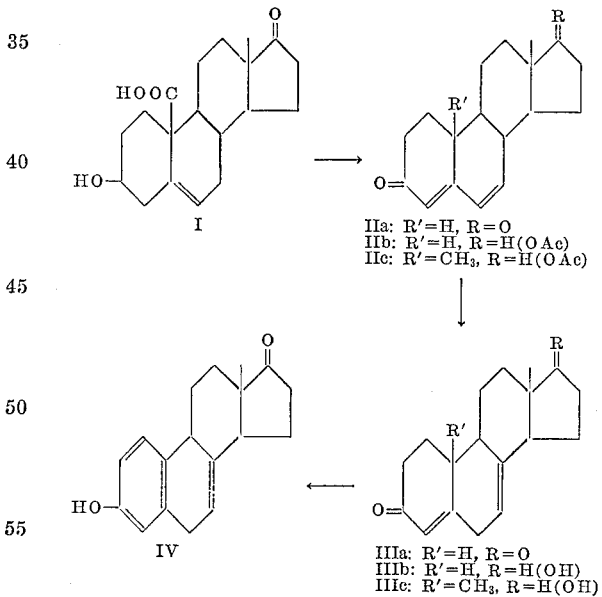

IIa: R'=H, R=O
IIb: R'=H, R=H(OAc)
IIc: R'=CH₃, R=H(OAc)

IIIa: R'=H, R=O
IIIb: R'=H, R=H(OH)
IIIc: R'=CH₃, R=H(OH)

EXAMPLE 1

3β-hydroxyandrost-5-en-17-one-19-oic-acid (I)

3β - acetoxy-5α-bromo-6β-hydroxyandrostan-17-one-19-oic acid 6,19-lactone (26.0 g.) is dissolved in ethanol (2.0 liters) and powdered zinc (175 g.) is added. The mixture is refluxed with vigorous stirring overnight, cooled and filtered through Celite (diatomaceous earth). The volume of the filtrate is reduced to about 300 ml. and potassium hydroxide (15.0 g.) in 50% water-methanol (30 ml.) is added to the solution. After refluxing the solution for 30 minutes, it is cooled, diluted with water and extracted with methylene chloride. The aqueous solution is acidified with 3 N hydrochloric acid and left in the refrigerator for several hours. Long needles of 3β-hydroxy-androst-5-en-17-one-19-oic acid (I) are collected by filtration, M.P. 271–272° C. A second crop, M.P. 248–255° C. is also obtained.

Calcd. for $C_{19}H_{26}O_4$ (318.40): C, 71.67; H, 8.23. Found: C, 72.01; H, 8.01.

EXAMPLE 2

*Estra-4,6-diene-3,17-dione (IIa)*

3β-hydroxyandrost-5-en-17-one-19-oic acid (I, 4.77 g.) is suspended in toluene (550 ml.) and cyclohexanone (120 ml.), and then 70 ml. of solvent are distilled off. After cooling, aluminum isopropoxide (7.5 g.) and chloranil (5.8 g.) are added. The reaction mixture is refluxed with stirring for two hours, cooled and acidified with dilute hydrochloric acid. This mixture is steam-distilled until no cyclohexanone is left, and worked up in the usual way by extraction with methylene chloride. The residue, after evaporation of solvent, is taken up in methanol (75 ml.) containing hydrochloric acid (0.5 ml.) and heated on a steam bath for 10 minutes. Dilution with water, extraction with methylene chloride followed by washing of the organic extracts with 8% sodium hydroxide solution gives, upon working up in the usual manner, a crude product which is purified by chromatography over alumina (Woelm, grade III). Elution with petroleum ether-benzene (2:3) gives a mixture of estra-4-ene-3,17-dione and estra-4,6-diene-3,17-dione (IIa). Further chromatography of this mixture yields, upon elution with benzene-ether and ether, estra-4,6-diene-3,17-dione (IIa), recrystallized from acetone-hexane, M.P. 180–182° C.; $[\alpha]_D^{23} +62°$ (1% in chloroform); λ max 282 mμ (ε 27,200).

EXAMPLE 3

Dry nitrogen gas is passed through a solution of estra-4,6-diene-3,17-dione (IIa, 252 mg.) in dimethyl sulfoxide (13 ml.) or dimethyl-formamide (15 ml.). Potassium t-butoxide (282 mg.) is added and the reaction mixture is stirred for 50 minutes at room temperature. The crude product is chromatographed on silica gel and elution with ether-benzene (3:7) gives a solid which after one crystallization from acetone-ether yields pure estra-4,7-diene-3,17-dione (IIIa), λ max 237 mμ (ε 11,700).

Similarly, 17β-acetoxyestra-4,6-dien-3-one (IIb), prepared as described in U.S. Pat. 3,067,212, is treated with potassium t-butoxide in dimethylsulfoxide to yield 17β-hydroxyestra-4,7-dien-3-one (IIIb), λ max 238 mμ (ε 9,500), and 17β-acetoxyandrosta-4,6-dien-3-one (IIc) yields 17β-hydroxyandrosta-4,7-dien-3-one (IIIc).

EXAMPLE 4

A culture of *Nocardia restrictus* (Ayerst Culture Collection No. B–226) is used to inoculate a medium of the following composition:

| | G. |
|---|---|
| Commercial glucose ("Cerelose") | 20 |
| Hydrolysate of lactalbumin ("Edamin") | 20 |
| Corn steep liquor | 5 |
| Distilled water to pH 6.5, 1 liter. | |

The medium is distributed into 250-ml. Erlenmeyer flasks at the rate 50 ml. medium per flask. Inoculated flasks are incubated at 25° C. for 64 hours. After incubation, the resulting culture is used to inoculate a medium of the same composition: 5 ml. of inoculant is used to inoculate 50 ml. of medium contained in a 250-ml. Erlenmeyer flask. Incubation is performed at 25° C. for 24 hours. After 24 hours of incubation, 25 mg. of 17β-hydroxyestra-4,7-dien-3-one (IIIb), dissolved in 0.5 ml. methanol is charged into the culture. The mixture is incubated at 25° C.; after 6 hours of incubation, the mixture is extracted twice with ethylene dichloride, and the resulting extract evaporated to dryness under nitrogen. Equilin (IV) accompanied by minor amounts of equilenin and estrone, is isolated by chromatography on silica gel as the main product of the reaction.

In the same manner, when incubating 25 mg. of estra-4,7-diene-3,17-dione (IIIa) with a culture of *Nocardia restrictus* obtained as above and working up as described previously, equilin (IV) accompanied by minor amounts of equilenin and estrone is obtained.

The equilin (IV) obtained from both starting materials described above is identical with an authentic sample of the compound.

EXAMPLE 5

A culture of *Nocardia restrictus* is grown as described above. Incubation is continued at 25° C. for 64 hours. After this incubation period, the culture is centrifuged, washed twice with distilled water, recentrifuged, and resuspended in a 1% phosphate buffer solution (pH 7); the suspension is filtered through glass wool, centrifuged again and resuspended in a 1% phosphate buffer solution (pH 7). The resulting suspension contains no mycelium, but only cells which are identified as *oidiospores* when observed under the microscope. The suspension is distributed into 250 ml. Erlenmeyer flasks to the amount of 50 ml. per flask. Twenty-five mg. of estra-4,7-diene 3,17-dione (IIIa) or of 17β-hydroxyestra-4,7-dien-3-one (IIIb) dissolved in 0.5 ml. methanol, respectively, is charged into the spore suspension, 0.625 ml. of potassium cyanide solution (3.25 mg./ml.) in water is added, and the incubation is continued for 8 hours. Equilin (IV), identical with an authentic sample, accompanied by minor amounts of estrone and equilenin, is isolated by chromatography on silica gel as the main product of the reaction.

We claim:
1. 17β-hydroxyestra-4,7-dien-3-one.
2. 17β-hydroxyandrosta-4,7-dien-3-one.
3. The method of preparing equilin which comprises subjecting 3β-hydroxyandrost-5-ene-17-one-19-oic acid to Oppenauer-type oxidation in the presence of chloranil to yield estra-4,6-diene-3,17-dione; treating said last-named compound with an alkali metal alkoxide in a solvent selected from the group which consists of dimethylsulfoxide, dimethylformamide, and methylsulfinyl anion in dimethyl-sulfoxide, thereby securing estra-4,7-diene-3,17-dione; and exposing said last-named compound to the enzymatic activity obtainable in a substantially neutral medium inoculated with the microorganism *Nocardia restrictus*, thereby securing equilin.
4. The method of preparing equilin which comprises treating estra-4,6-diene-3,17-dione with an alkali metal alkoxide in a solvent selected from the group which consists of dimethyl sulfoxide, dimethyl formamide, and methylsulfinyl anion in dimethyl sulfoxide, thereby securing estra-4,7-diene-3,17-dione; and subjecting said last-named compound to the enzymatic activity of the microorganism *Nocardia restrictus*, thereby securing equilin.
5. The method of deconjugating a steroidal $\Delta^{4,6}$-3-ketone to the corresponding $\Delta^{4,7}$-3-ketone which comprises treating said steroidal $\Delta^{4,6}$-3-ketone with an alkali metal alkoxide in a solvent selected from the group which consists of dimethyl-sulfoxide, dimethylformamide, and methylsulfinyl anion in dimethylsulfoxide, thereby securing said steroidal $\Delta^{4,7}$-3-ketone.
6. The method of deconjugating a steroidal $\Delta^{4,6}$-3-ketone selected from the group which consists of estra-4,6-diene-3,17-dione, 17β-acetoxy-estra-4,6-dien-3-one, and 17β-acetoxyandrosta-4,6-dien-3-one to the corresponding $\Delta^{4,7}$-3-ketone selected from the group which consists of estra-4,7-diene-3,17-dione, 17β-hydroxyestra-4,7-dien-3-one, and 17β-hydroxyandrosta-4,7-dien-3-one, which comprises treating said steroidal $\Delta^{4,6}$-3-ketone with an alkali metal alkoxide in a solvent selected from the group which consists of dimethylsulfoxide, dimethylformamide, and methylsulfinyl anion in dimethyl sulfoxide.
7. The method of deconjugating estra-4,6-diene-3,17-dione which comprises treating said estra-4,6-diene-3,17-dione with an alkali metal alkoxide in a solvent selected from the group which consists of dimethylsulfoxide, dimethylformamide, and methylsulfinyl anion in dimethyl sulfoxide.

8. The method of deconjugating 17β-acetoxy-estra-4,6-dien-3-one to the corresponding $\Delta^{4,7}$-3-ketone which comprises treating said compound with an alkali metal alkoxide in a solvent selected from the group which consists of dimethylsulfoxide, dimethylformamide, and methylsulfinyl anion in dimethylsulfoxide, thereby securing 17β-hydroxy-estra-4,7-dien-3-one.

9. The method of deconjugating 17β-acetoxyandrosta-4,6-dien-3-one to the corresponding $\Delta^{4,7}$-3-ketone which comprises treating said compound with an alkali metal alkoxide in a solvent selected from the group which consists of dimethylsulfoxide, dimethylformamide, and methylsulfinyl anion in dimethylsulfoxide, thereby securing 17β-hydroxyandrosta-4,7-dien-3-one.

10. The method of preparing equilin which comprises treating 17β-acetoxyestra-4,6-dien-3-one with an alkali metal alkoxide in a solvent selected from the group which consists of dimethylsulfoxide, dimethylformamide, and methylsulfinyl anion in dimethylsulfoxide, thereby securing 17β-hydroxyestra-4,7-dien-3-one; and subjecting said last-named compound to the enzymatic activity of the microorganism *Nocardia restrictus,* thereby securing equilin.

11. The method of deconjugating a steroidal $\Delta^{4,6}$-3-ketone to the corresponding $\Delta^{4,7}$-3-ketone of the androstane and estrane series which comprises treating said $\Delta^{4,6}$-3-ketone with potassium t-butoxide in a solvent selected from the group which consists of dimethyl sulfoxide, dimethylformamide, and methylsulfinyl anion in dimethylsulfoxide, said treatment being carried out at a temperature within the range 0° C.–100° C.

12. The method of deconjugating estra-4,6-diene-3,17-dione to the corresponding $\Delta^{4,7}$-3-ketone which comprises subjecting said compound, at a temperature within the range 0° C.–100° C., to the action of potassium t-butoxide in solution in a solvent selected from the group which consists of dimethylsulfoxide, dimethylformamide, and methylsulfinyl anion in dimethylsulfoxide, thereby obtaining estra-4,7-diene-3,17-dione.

13. The method of deconjugating 17β-acetoxyestra-4,6-dien-3-one to the corresponding $\Delta^{4,7}$-3-ketone which comprises subjecting said compound, at a temperature within the range 0° C.–100° C., to the action of potassium t-butoxide in solution in a solvent selected from the group which consists of dimethylsulfoxide, dimethylformamide, and methylsulfinyl anion in dimethylsulfoxide, thereby obtaining 17β - hydroxy-estra - 4,7 - diene-3-one.

14. The method of deconjugating 17β-acetoxyandrosta-4,6-dien-3-one to the corresponding $\Delta^{4,7}$-3-ketone which comprises subjecting said compound, at a temperature within the range 0° C.–100° C., to the action of potassium t-butoxide in solution in a solvent selected from the group which consists of dimethylsulfoxide, dimethylformamide, and methylsulfinyl anion in dimethylsulfoxide, thereby obtaining 17β-hydroxyandrosta-4,7-dien-3-one.

15. The process of preparing equilin which comprises treating 3β-hydroxyandrost-5-en-17-one-19-oic acid with aluminum isopropoxide and chloranil, thereby obtaining estra-4,6-diene-3,17-dione; treating said last-named compound at a temperature within the range 0° C.–100° C. with potassium t-butoxide in a solvent selected from the group which consists of dimethylsulfoxide, dimethylformamide, and methylsulfinyl anion in dimethylsulfoxide, thereby obtaining estra-4,7-diene-3, 17-dione; and subjecting said last-named compound to the enzymatic activity of the microorganism *Nocardia restrictus* in a substantially neutral medium, thereby obtaining equilin.

16. The process of preparing equilin which comprises treating estra-4,6-diene-3,17-dione, at a temperature within the range 0° C.–100° C., to the action of potassium t-butoxide in a solvent selected from the group which consists of dimethylsulfoxide, dimethylformamide, and methylsulfinyl anion in dimethylsulfoxide, thereby obtaining estra-4,7-diene-3,17-dione; and subjecting said last-named compound, in a substantially neutral medium, to the enzymatic activity of the microorganism *Nocardia restrictus,* thereby obtaining equilin.

17. The process of preparing equilin which comprises treating 17β-acetoxyestra-4,6-dien-3-one, at a temperature within the range 0° C.–100° C., to the action of potassium t-butoxide in a solvent selected from the group which consists of dimethylsulfoxide, dimethylformamide, and methylsulfinyl anion in dimethylsulfoxide, thereby obtaining 17β-hydroxy-estra-4,7-dien-3-one; and subjecting said last-named compound, in a substantially neutral medium, to the enzymatic activity of the microorganism *Nocardia restrictus,* thereby obtaining equilin.

References Cited by the Examiner

Zderic: "Steroids," vol. 1, No. 3, March 1963, pp. 233–239 relied on.

LEWIS GOTTS, *Primary Examiner.*

ELBERT L. ROBERTS, *Assistant Examiner.*